United States Patent [19]

Surdilla

[11] Patent Number: 4,515,296
[45] Date of Patent: May 7, 1985

[54] VARIABLE RATIO LIQUID METERING DISPENSER

[76] Inventor: Silverio B. Surdilla, 32400 Lois Way, Union City, Calif. 94587

[21] Appl. No.: 422,072

[22] Filed: Sep. 23, 1982

[51] Int. Cl.³ .............................................. G01F 11/06
[52] U.S. Cl. .................... 222/134; 222/334; 74/110; 74/348; 417/343; 417/426
[58] Field of Search .................. 222/134, 334; 74/349, 74/348, 110; 417/343, 426

[56] References Cited

U.S. PATENT DOCUMENTS 3,710,982  1/1973  Ferrari ................................. 222/134
4,366,918  1/1983  Naka .................................. 222/334 X

FOREIGN PATENT DOCUMENTS 42617   6/1910  Austria .................................. 74/349
73227   2/1917  Switzerland ........................... 74/349

Primary Examiner—Joseph J. Rolla
Assistant Examiner—Frederick R. Handren
Attorney, Agent, or Firm—Linval B. Castle

[57] ABSTRACT

A variable speed ratio system for the controlled dispensing of a plurality of non-compressible fluids at high pressure, principally for use in reaction injection molding processes. Each of the pistons in two or more displacement cylinders that contain the fluids to be mixed is connected via a rack gear to the piston of a hydraulic driving cylinder, all hydraulic cylinders being connected to a common source of pressure. A variable speed change gear train connected to each rack gear will control the speed ratios of the displacement pistons irrespective of the fluid viscosities or mixing orifice sizes while the gears are subjected to only the differences in forces acting on the displacement piston rods.

3 Claims, 10 Drawing Figures

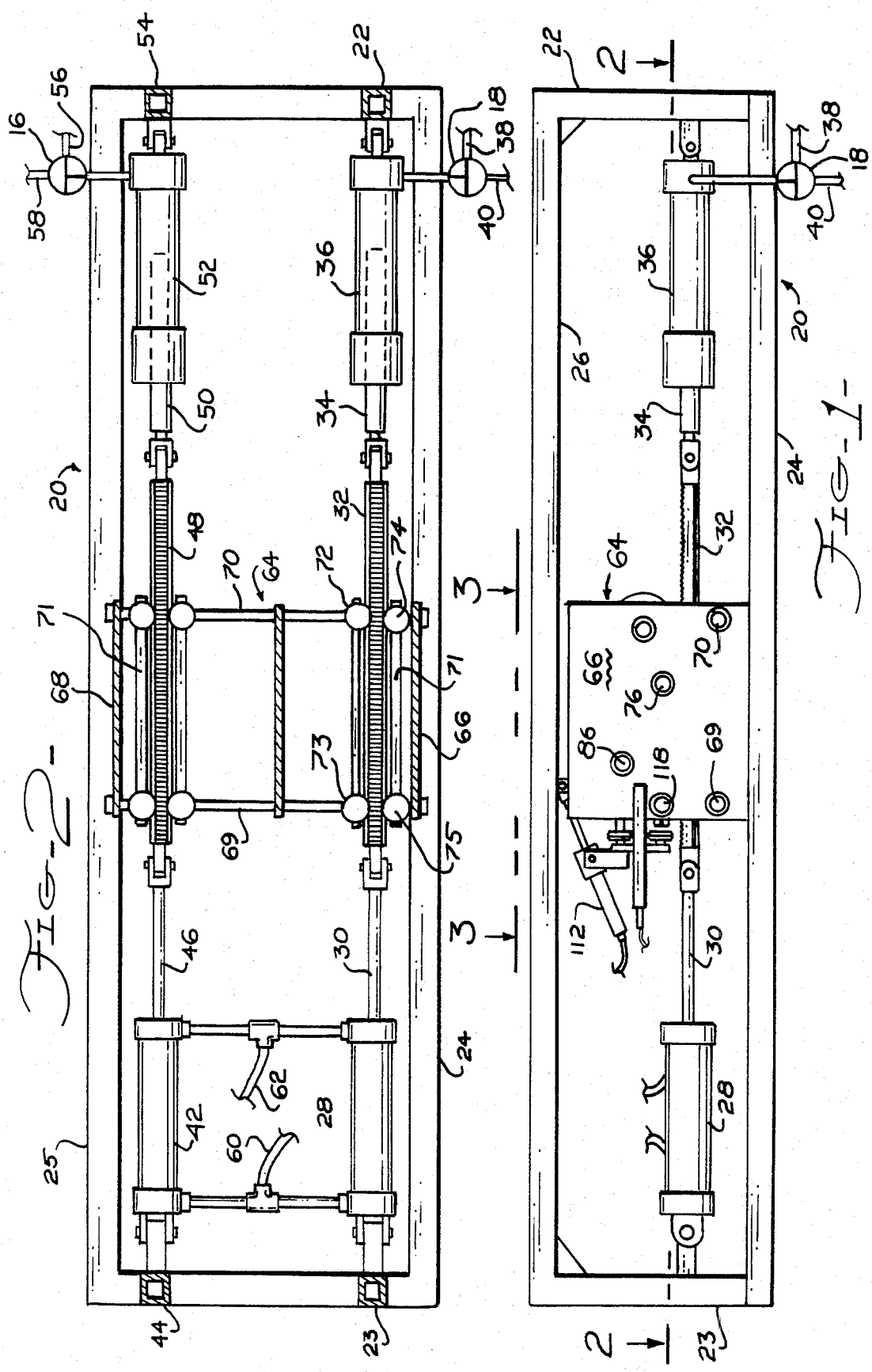

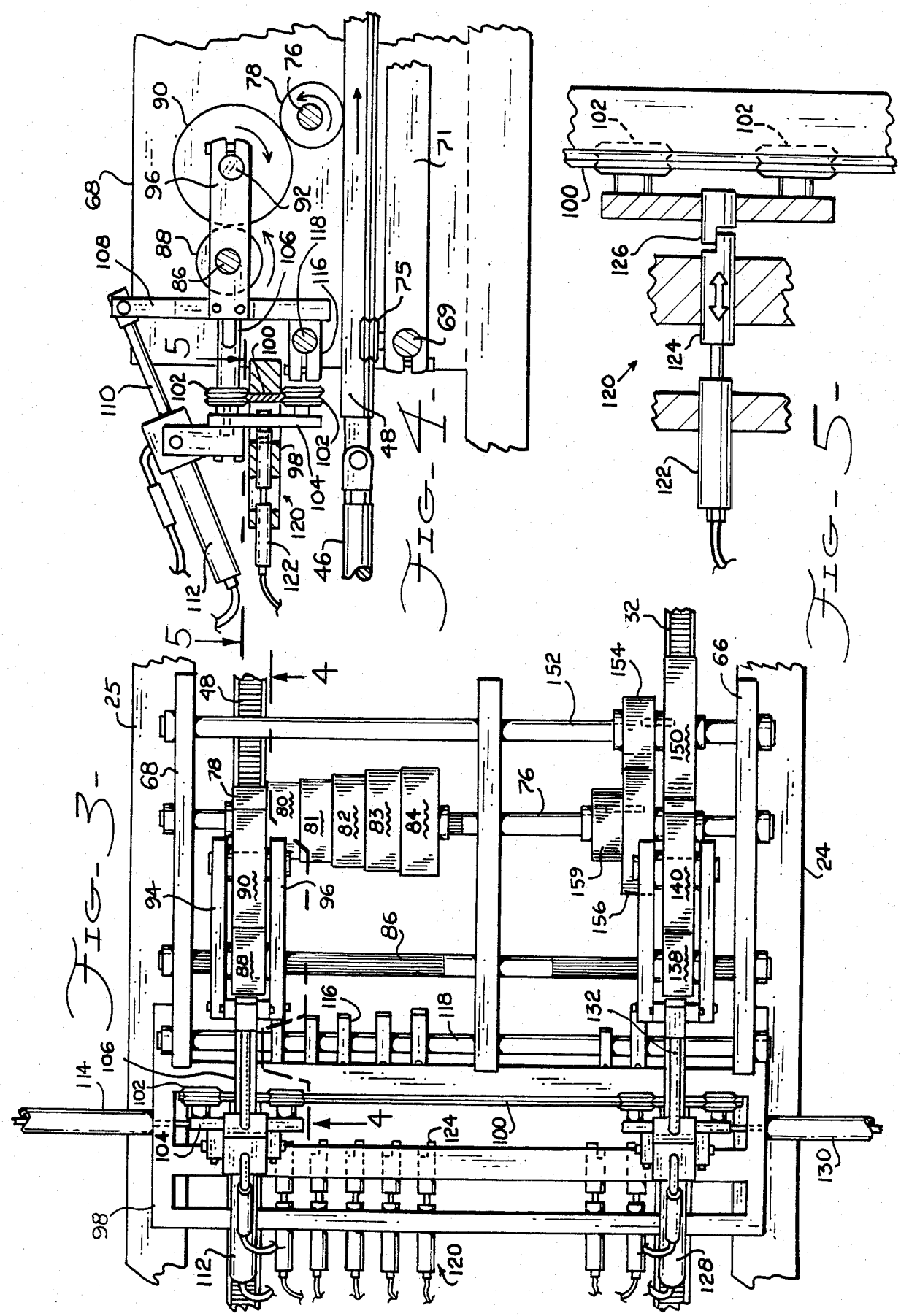

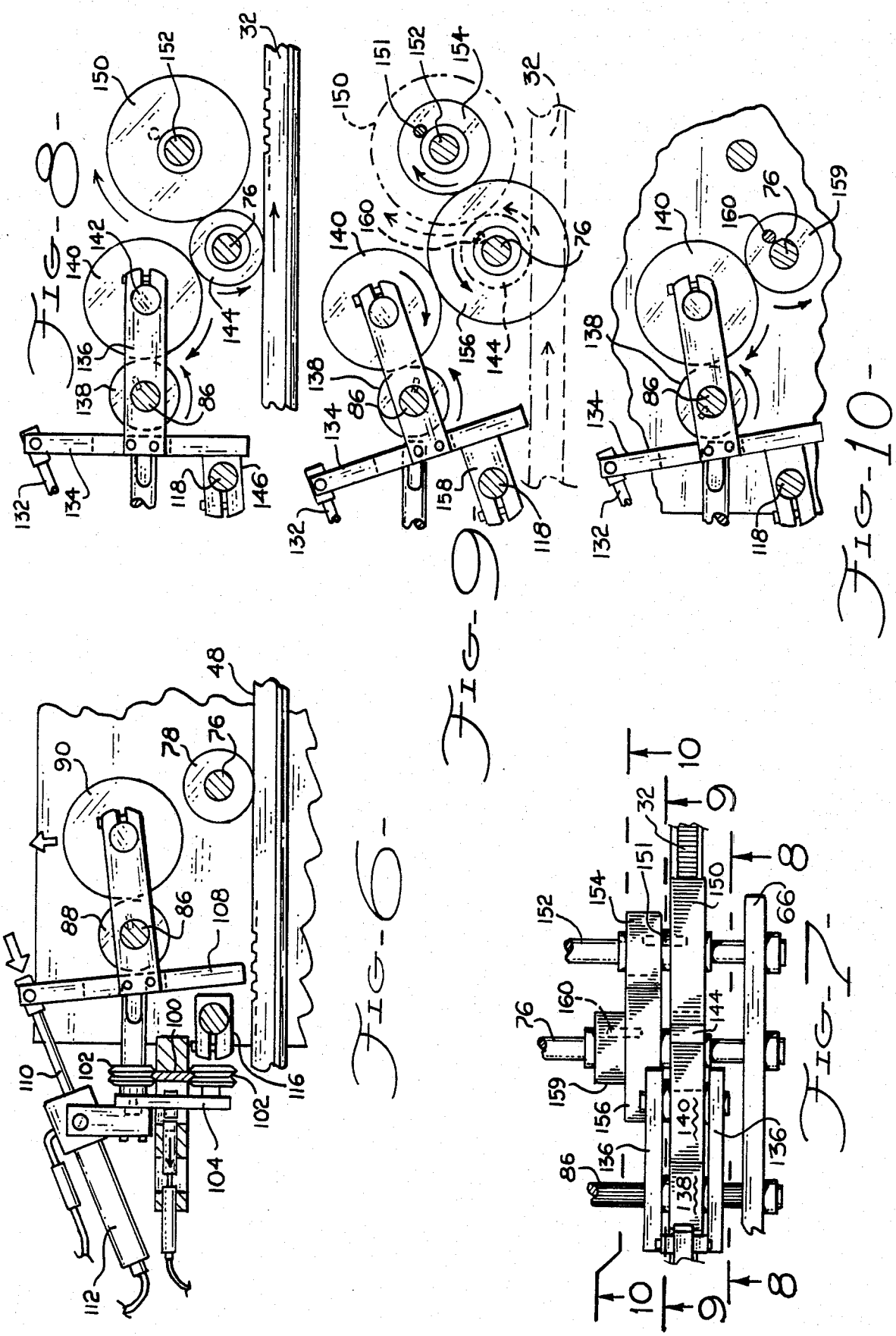

4,515,296

VARIABLE RATIO LIQUID METERING DISPENSER

BACKGROUND OF THE INVENTION

This invention relates to a system for the precise and adjustable metering of a plurality of liquids to be mixed and particularly to a high pressure and high flow rate metering system primarily for use in the plastics industry for reaction injection molding.

Reaction injection molding (RIM), or the use of rapid polymerizing reactants in liquid injecting molding is a process requiring an accurate metering of two or more heavy viscous fluids which, when intermixed in a predetermined ratio, are rapidly reactive to form a solid polymer. The metering of such viscous materials is generally performed by the application of a high pressure, often at a relatively high temperature, to force the fluids through small diameter orifices.

Many of the heavy viscous liquids and fiber-filled liquids used by the present day plastic industries must be metered from the displacement cylinders at relatively high pressures, in the order of 2,000 to 3,000 p.s.i. It is therefore necessary to employ displacement piston driving mechanisms that can apply the required forces to each piston stem without any danger of exceeding the stress limitations of the components in the mechanism. One prior art mechanism for accurately applying equal forces to two displacement cylinders is disclosed in U.S. Pat. No. 3,710,982 to Ferrari wherein a hydraulically operated piston linearly drives a shaft connected to one metering or displacement cylinder. The shaft carries a rack gear that is coupled through gears to a second rack on a second shaft that drives the piston in a second displacement cylinder. Thus, the gear ratio controls the linear velocity ratio between the two racks and hence the liquid mixing ratio. While this system is accurate and efficient, it requires heavy gears since the gear tooth load must be adequate to apply a full force to the driving piston in the second displacement cylinder. Furthermore, because of the requirement for such heavy duty gearing, a quick change transmission may be very large and impractical so that liquid ratio changes would require individual gear changes, a time-consuming process affecting production downtime.

Another prior art mechanism disclosed in U.S. Pat. No. 4,286,732 to James employs an electrical motor-driven rotatable driven shaft for driving each displacement piston. While this system may be quite accurate and adequate for the dispensing of liquids at relatively low pressures, a thick viscous liquid which requires the higher displacement cylinder pressures in the order of 2,000 to 3,000 p.s.i., may readily exceed the stress limitations of the gear teeth or shaft threads. It is, of course, possible to construct the teeth and threads of suitable materials and sizes that will ensure against such damage; however, the cost of this type of construction may render the task exceedingly costly and impractical.

The present invention is capable of applying very high forces to a plurality of displacement cylinder pistons while accurately controlling the displacement ratios and without applying excessive stresses to the gear train teeth or to any other components of the apparatus.

BRIEF DESCRIPTION OF THE INVENTION

Briefly described, the metering system of the invention includes a plurality of displacement cylinders for dispensing viscous liquids under high pressure and at selected metering ratios. The piston in each displacement cylinder is connected to one end of a rack gear. The second end of the rack gear is connected to the piston of a hydraulic driving cylinder so that each of the plurality of displacement pistons is directly and linearly driven by its own hydraulic cylinder with each of the hydraulic cylinders powered from a single hydraulic pressure source. A variable speed change gear train is connected between each rack gear to control the linear speed ratios of the racks, hence the liquid metering ratios of the system. The gear train is therefore not subjected to the full stresses developed in the system, but only to the difference in forces acting on the displacement piston rods.

DESCRIPTION OF THE DRAWINGS

In the drawings which illustrate a preferred embodiment of the invention:

FIG. 1 is an elevation view illustrating basic sections of the liquid dispenser;

FIG. 2 is a plan view taken along the lines 2—2 of FIG. 1;

FIG. 3 is a plan view of the speed ratio control gearing in the apparatus taken along the lines 3—3 of FIG. 1;

FIG. 4 is an elevation view of gearing associated with a first rack gear and is taken along the lines 4—4 of FIG. 3;

FIG. 5 is a plan view of a gear position stop mechanism taken along the lines 5—5 of FIG. 4;

FIG. 6 is a schematic elevation view illustrating the changing of gears illustrated in FIG. 4;

FIG. 7 is a plan view of gearing associated with a second rack gear; and

FIGS. 8, 9 and 10 are elevation views of gearing shown in FIG. 7 and are taken along the lines 8, 9 and 10, respectively, of FIG. 7.

DETAILED DESCRIPTION OF THE PREFERRED EMBODIMENT

The preferred embodiment to be described includes two displacement cylinders, each connected by a rack gear to a hydraulic driving cylinder. The apparatus may be constructed with additional displacement cylinders for metering, in addition to the basic components, such liquids as color additives, foaming agents, etc., and the linear drive of each displacement piston in each of the plurality of displacement cylinders may be precisely controlled by additional and similar gearing interconnecting their respective rack gears.

To best understand the basic operation of the invention, consider two separate identical metering systems, each comprising a displacement cylinder containing a heavy viscous liquid or non-compressible fluid to be metered through a mixing orifice. The piston rod of each displacement cylinder is connected to one end of a shaft, the second end of which is connected to the piston rod of a hydraulic driving cylinder. For minimum stresses at maximum force, the piston rods of both hydraulic and displacement cylinders and the interconnecting shafts are linearly aligned. Each hydraulic cylinder receives the same hydraulic pressure, preferably from a common source.

Under such conditions, the two separate and parallel systems will very likely meter the same quantities of fluid per unit time provided they have identical metering orifices and the liquid viscosities are identical. In such a system, identical metered quantities will be assured irrespective of their viscosities if the shafts interconnecting each hydraulic and displacement pistons are provided with rack gears and are connected together with identical pinion gears keyed to a common shaft. If the liquidsin the two identical displacement cylinders are identical, the gears will merely be riding in the rack gears without being subjected to any forces because the hydraulic pistons, being subjected to identical pressures, will provide identical forces down the shaft and rack. But if the viscosities and/or orifice sizes are different, the synchronizing pinion gears will still assure identical linear velocities of the two rack gears, and the pinion gears will only be subjected to those relatively low tooth loads necessary to maintain equal shaft velocities.

To obtain different shaft speeds, hence different metering rates from the two displacement cylinders, different gear ratios may be used. For example, if the first rack gear engages a pinion gear having twenty teeth whereas the second rack engages a gear of forty teeth, one rotation of the common interconnecting shaft to which the gears are keyed will force the second rack to linearly travel twice the distance and velocity travelled by the first rack gear. Different orifice sizes and/or different viscosities of the fluids in the displacement cylinders can vary the required piston rod forces but the speed of each displacement piston and hence the metering of the liquids is controlled by the gearing which is subjected only to those loads necessary to control the shaft speed ratios. The variable ratio fluid dispenser to be described employs a gear transmission or controller that provides eighteen different shaft speed ratios ranging from one-to-one to six-to-one. If desired, additional gearing may be added to provide a greater selection of speed or dispensing ratios.

FIG. 1 is a side elevation view of a portion of my variable ratio liquid dispenser illustrating a rectangular box frame 20 having vertical legs 22 and 23 interconnected at the bottoms with the horizontal floor member 24 and across the top with the top member 26. Because of the high forces involved in the liquid dispensing mechanism, the box frame and legs are preferably constructed of welded structural steel tubing. Pivotally attached to the leg 23 is a hydraulic cylinder 28 that is powered and actuated in either direction by a conventional hydraulic control system, not shown.

The piston in the cylinder 28 is connected to the piston rod 30 which is pivotally connected to the first end of a rack gear shaft 32. The second end of the shaft 32 is pivotally connected to the piston rod 34 of a displacement cylinder 36 which is pivotally connected to the leg 22. Displacement cylinder 36 preferably has a relatively large bore for accommodating a quantity of the fluid to be dispensed to a mixing orifice (not shown) from an exit conduit 38. The fluid is drawn in from a storage vessel through the conduit 40 when the hydraulic control system reverses the stroke at the piston rod 30.

FIG. 2 is a plan view of the apparatus of FIG. 1 and illustrates a second dispensing system in parallel with that shown in FIG. 1. In FIG. 2, the hydraulic cylinder 42 is pivotally coupled to a vertical frame leg 44 and its piston rod 46 is coupled to one end of the rack shaft 48, the second end of which is coupled to the piston rod 50 of the displacement cylinder 52 which is pivotally connected to the vertical leg 54 of the frame 20. As with the displacement cylinder 36, the cylinder 52 may contain a liquid which is dispensed under control of a direction control valve 16 through an exit conduit 56 to a mixing orifice (not shown) and drawn in from a supply source through the conduit 58. Hydraulic cylinder 42 is in parallel with the cylinder 28 so that the fluid from the hydraulic pressure source is admitted through high pressure conduit 60 to both of the cylinders 28 and 42 to exert an outward force on the piston rods 30 and 46 and through conduit 62 to draw in the rods 30 and 46. The directional control valves 16, 18 may be automatically operated in proper sequence by a linkage (not shown) to the piston rods 50 and/or 34.

Mounted on the parallel horizontal rails forming the floor members 24 of the frame is a linear velocity ratio controller 64 which is a variable gear transmission. As will be subsequently described, the variable ratio controller 64 includes a pair of steel plate side members 66 and 68 mounted to the floor members 24 and 25 and each mounted in a vertical plane for supporting the various gear shafts in the controller. As shown in the plan view of FIG. 2, a pair of cross rods 69 and 70 interconnect the two side members 66 and 68. The cross rods 69 and 70 adjustably support horizontal brackets 71 which support vertical axis guide rollers 72–75 against each side of the rack gear shaft 32 to ensure that this interconnecting shaft and its associated piston rods 30 and 34 remain properly aligned. Similar adjustable rollers are associated with the shaft 48.

FIG. 3 is a plan view illustrating the preferred gearing arrangement within the linear speed ratio controller 64. The gears associated with the rack gear shaft 32 produce relatively large speed ratio changes and may be designated as the primary change gears. The secondary change gears, those that produce a relatively small speed ratio change, are associated with the rack shaft 48 and are illustrated in the upper portion of FIG. 3 and in FIG. 4 which is an elevation view taken along the lines 4—4 of FIG. 3. Connected between side members 66 and 68 is a gear shaft 76 which supports a pinion gear 78 that meshes with the rack gear on rack shaft 48, as illustrated in FIG. 4. Also mounted to the gear shaft 76 are gears 80–84. Gear 80 has a slightly greater pitch diameter than the pinion gear 78 and the diameter of each subsequent gear 80–84 increases as illustrated in FIG. 3. All of the gears 78–84 preferably have splined bores and are locked to the splined section of the shaft 76 so that rotation of the pinion gear 78 which engages the rack shaft 48 will cause the remaining gears 80–84 to rotate with it.

Rotatably supported on bearings between side members 66 and 68 is a shaft 86 which interconnects the gearing associated with the rack gear shaft 48 and the rack gear shaft 32. Shaft 86 preferably has two splined sections along its length along which gears with splined bores may readily slide. As illustrated in FIG. 4, a pinion gear 88 of the secondary change gears is splined for longitudinal movement along the splined shaft 86 and intermeshed with the pinion gear 88 is an idler gear 90 rotatably mounted on a short shaft 92 mounted between side plates 94 and 96. As illustrated in FIG. 4, gear 78 that meshes with the rack gear on shaft 48 rotates the idler gear 90 which, in turn, rotates the pinion gear 88 to thereby rotate the shaft 86.

The preferred embodiment includes means, controlled from a remote position for shifting the idler gear 90 into engagement with any of the gears 78–84. Mounted between the side members 66 and 68 is a frame 98 that supports a fixed trolley rail 100, the top and bottom edges of which are formed to engage rotatable trolleys 102 as shown in FIGS. 3 and 4. The trolleys 102 are rotatably mounted to horizontal trolley shafts which are connected to a short vertical trolley plate 104. Connected to the trolley plate is one end of an arm 106, the opposite end of which slideably fits into the slot formed between the side plates 94 and 96. Thus, lateral motion of the trolleys 102 along the fixed rail 100 will enable the gear 90 to engage either the pinion gear 78 that is meshed with the rack gear shaft 48 or any of the other gears 80-84 that rotate with the gear 76.

As illustrated in FIG. 4, the gear side plates 94 and 96 are connected to a vertical bar 108, the top end of which is pivotally connected to the piston shaft 110 of a pneumatic actuator or cylinder 112 which is controlled from a remote source (not shown). When the cylinder 112 draws in its piston shaft 110, the vertical bar 108 and side plates 94 and 96 are rotated on bushings about the splined shaft 86 to lift the gear 90 out of engagement with the pinion gear 78 as best illustrated in FIG. 6.

As illustrated in FIG. 3, a second pneumatic actuator or cylinder 114 is connected to the frame member 98 and its piston shaft is connected to the trolley plate 104 to which is mounted the trolleys 102. Thus, when the gear 90 is lifted as illustrated in FIG. 6, the cylinder 114 may be used to move the entire trolley assembly, including the cylinder 112, pinion 88, and idler gear 90 to a new selected location along the fixed tolley rail 100 so that the gear 90 may be lowered to engage one of the other gears 80-84. When the gear 90 is so lowered by actuation of pneumatic cylinder 112, the lower end of the vertical bar 108 engages a stop 116 mounted on a shaft 118 interconnecting the side members 66 and 68 of the linear ratio controller. As illustrated in FIG. 3, a stop 116 is associated with each of the gears 78-84 and each stop extends from the shaft 118 by the amount necessary to permit the gear 90 to properly engage the corresponding gears 78-84.

As illustrated in FIGS. 3, 4, and in greater detail in FIG. 5, a lateral stop mechanism 120 is located at each of the several positions the idler gear 90 may engage any of the gears 78-84. The stop mechanism includes a small pneumatic piston 122, which can extend a stop 124 to engage a corresponding stop 126 on the trolley assembly. Therefore, to operate the trolley assembly so that the gear 90 will properly engage any of the gears 78-84, the pneumatic cylinder 112 is drawn inward to lift the idler gear 90 out of engagement with the pinion 78. The second pneumatic cylinder 114 then draws the trolley assembly, including the pinion 88 and idler gear 90, to its extreme outboard end. The operator then selects the appropriate stop mechanism 120 which, when energized, extends the stop 124 into the path of the trolley mechanism. The pneumatic cylinder 114 is then re-energized to force the entire trolley assembly up against the selected extending stop 124. Pinion 88 is then at the proper location along the shaft 86 and the cylinder 112 is therefore extended to engage the gear 90 with the appropriate one of the gears 78-84.

FIG. 7 is a plan view of the primary change gearing associated with the rack gear shaft 32, and FIGS. 8-10 are sectional elevation views taken along the lines 8—8, 9—9, and 10—10 of FIG. 7, and illustrate three different gear positions that may be selected to translate the motion of the rack gear shaft 32 to the splined shaft 86 that interconnects with the secondary gearing associated with the rack gear 48. As shown in FIG. 3, the selection of the desired speeds for the primary change gears on the rack gear shaft 32 is accomplished by a pneumatic cylinder 128 and a lateral positioning of pneumatic cylinder 130 in a manner identical to that performed by the cylinders 112 and 114 described above in connection with the secondary change gears.

A pneumatic cylinder 128 includes a piston shaft 132 which, as best illustrated in FIGS. 8-10, is pivotally connected to the top of a bar 134 to which is connected a pair of side plates 136 as illustrated in FIG. 7. The side plates 136 are journalled for rotation about the splined shaft 86. A pinion 138 having its axial hole splined for rotation with the splined shaft 86 engages a larger idler gear 140 that is journalled for rotation about the short shaft 142 mounted between the side plates 136. Thus, in one gearing position, the piston shaft 132 of pneumatic piston 128 has been extended to force the idler gear 140 into engagement with a pinion 144 which is in permanent engagement with the rack gear on the shaft 32 and is freely rotatable on the shaft 76. It will be noted that the lower end of the bar 134 rests against a stop 146 that is rigidly clamped to the cross shaft 118 and which performs the same function as the stop 116 explained in connection with FIG. 6, above.

FIG. 9 illustrates a second gearing position. The pinion 144 rotatable on the shaft 76 and engaging the rack gear of shaft 32 also engages a larger diameter gear 150 journalled for rotation about a shaft 152. As illustrated in FIG. 9, the larger gear 150 is pinned by pin 151 to a smaller diameter gear 154 which is also 3ournalled for rotation on the shaft 152 with the gear 150. The smaller diameter gear 154 meshes with the larger diameter gear 156 which is journalled for rotation about the shaft 76 and is independent from the rotation of the pinion 144. When the pneumatic cylinder 128 and the lateral positioning cylinder 130 are operated to select the second position illustrated in FIG. 9, the assembly comprising the actuator 128, gear 140 and pinion 138 are laterally moved and the pneumatic cylinder shaft 132 is extended to permit engagement of the teeth of the gear 140 with those on the gear 156. It will be noted that the stop mechanism 158 on the shaft 118 is somewhat longer than the stop mechanism 146 of FIG. 8 and is pitched at an angle to properly intercept the lower end of the bar 134 at the point of proper engagement of the gears 140 and 156.

The third gear position is illustrated in FIG. 10. In this position, the gear 140 engages the teeth of still another gear 159 journalled for free rotation about the shaft 76 but which is pinned by the pin 160 to the gear 156. Thus, the shaft 76 supports three gears associated with the rack gear 32; the pinion 144 that engages the rack shaft 32, the gear 156 and the gear 159 which is pinned to the gear 156.

In the embodiment described, the primary change gears associated with the rack shaft 32 provides three coarse gear change ratios whereas the secondary change gears associated with the rack shaft 48 provides six fine gear ratios. Thus, the total gear ratio between the rack shafts 32 and 48 are therefore equal to eighteen in the embodiment described. More or fewer gear ratios may be employed if desired, and their selection made by adding or removing lateral positions of the stop mechanism described in connection with FIG. 5.

In the preferred embodiment described, the range of rack gear speed ratios, hence liquid dispensing ratios, of between 1:1 and 1:6 are achieved with gears according to the following table:

| PRIMARY CHANGE GEARS | | SECONDARY CHANGE GEARS | |
|---|---|---|---|
| Gear No. | Number of Teeth | Gear No. | Number of Teeth |
| 138 | 20 | 78 | 20 |
| 140 | 40 | 80 | 22 |
| 144 | 20 | 81 | 24 |
| 150 | 40 | 82 | 26 |
| 154 | 20 | 83 | 28 |
| 156 | 40 | 84 | 30 |
| 159 | 20 | 88 | 20 |
|  |  | 90 | 40 |

It will be noted that the actuators for positioning the gear assembly along the splined shaft 86 is preferably pneumatic but may, if desired, be actuated by solenoid or hydraulic forces. In the preferred embodiment, pneumatic pressure at approximately 100 p.s.i. is employed to operate the actuators, such as the actuators 112 and 128 or the lateral positioning actuators 114 and 130. The use of pneumatic actuators at this relatively low pressure provides a gear safety mechanism so that if one of the racks or gears became jammed or otherwise stalled, the movable gears, such as the gears 90 or 140, will remain engaged with their associated meshing gears but only to the extent that they are held in such engagement by the pneumatic force exerted by the pneumatic actuators 112 and 128. At higher stalling forces, the pneumatic pressure will be overcome and the gears 90 and 140 which are held in position by the pneumatic force, will become disengaged from their associated gears to thereby prevent damage to the gear teeth and/or the splined shaft 86.

As previously noted, the system may include more than two displacement cylinder mechanisms in parallel. If additional piston mechanisms are desired, it is only necessary to interconnect the gearing coupled to the respective rack shaft of each of the cylinder assemblies with a common splined shaft, such as the shaft 86, so that there will be one common control for the speed ratios of all rack gear shafts and associated cylinders.

What is claimed is:

1. A system for dispensing a plurality of liquids in predetermined ratios, said system comprising:

a plurality of displacement cylinders, each having a displacement piston longitudinally movable within its respective cylinder for dispensing a liquid from the displacement cylinder;

a corresponding plurality of hydraulic driving cylinders, each coupled to the same hydraulic pressure source and each having a driving piston longitudinally movable in response to hydraulic pressure applied to its respective driving cylinder, each one of said plurality of driving pistons being coaxial with, and interconnected by a rack gear to one of said plurality of displacement pistons; and a variable speed transmission having rack engaging pinion gears for coupling said transmission to each rack gear for controlling the longitudinal velocity of each of said displacement pistons within its respective displacement cylinder upon the application of hydraulic pressure to said plurality of driving cylinders, said transmission including coarse change gears having a first meshing gear for meshing with a first one of said rack engaging pinion gears, and fine change gears having a second meshing gear for meshing with a second one of said rack engaging pinion gears, said coarse and fine change gears including, respectively, third and fourth pinion gears mounted for rotation upon a common rotatable splined shaft that interconnects said coarse and fine change gears, said first and second meshing gears in said coarse and fine change gears being disengaged from their repsective rack engaging pinion gears for gear ratio changes and reengaged thereto by first and second pneumatic cylinders having pistons coupled to first and second pivotable arms supporting said first and second meshing gears.

2. The dispensing system claimed in claim 1 wherein said third and fourth pinion gears are longitudinally moved along said interconnecting rotatable shaft by third and fourth pneumatic cylinders having pistons movable along axes substantially parallel with said rotatable shaft and respectively coupled to said first and second pivotable arms.

3. The dispensing system claimed in claim 2 wherein said variable speed transmission further includes a plurality of stops mounted upon a second shaft parallel with said rotatable shaft and at positions along said second shaft that correspond with positions of engagement of said third and fourth pinion gears with the gears in said coarse and fine change gears, said stops being selectively extendable for positioning said third and fourth pinion gears during operation of said third and fourth pneumatic cylinders.

* * * * *